US006891987B2

(12) United States Patent
Ionov et al.

(10) Patent No.: US 6,891,987 B2
(45) Date of Patent: May 10, 2005

(54) MULTI-APERTURE BEAM STEERING SYSTEM WITH WAVEFRONT CORRECTION BASED ON A TUNABLE OPTICAL DELAY LINE

(75) Inventors: Stanislav I. Ionov, Calabasas, CA (US); David S. Sumida, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 10/411,994

(22) Filed: Apr. 11, 2003

(65) Prior Publication Data

US 2003/0202731 A1 Oct. 30, 2003

Related U.S. Application Data

(60) Provisional application No. 60/375,614, filed on Apr. 24, 2002.

(51) Int. Cl.[7] ............................ G02B 6/26; G02B 6/34; G02B 6/42
(52) U.S. Cl. .............................. 385/15; 385/3; 385/27; 385/37; 359/263; 359/316; 359/318; 359/572; 342/368; 342/375
(58) Field of Search ................................ 359/263, 316, 359/318, 572; 385/3, 15, 27, 37; 342/368, 375

(56) References Cited

U.S. PATENT DOCUMENTS

| | | |
|---|---|---|
| 3,894,792 A | 7/1975 | Komatsubara et al. .. 350/160 R |
| 4,240,696 A | 12/1980 | Tracy et al. ................ 350/163 |
| 4,639,091 A | 1/1987 | Huignard et al. ....... 350/347 V |
| 4,736,463 A | 4/1988 | Chavez ....................... 455/606 |
| 4,813,766 A | 3/1989 | Keene et al. ............... 350/337 |
| 4,937,539 A | 6/1990 | Grinberg et al. ............. 330/4.3 |
| 4,953,939 A | 9/1990 | Epworth ................... 350/96.19 |

(Continued)

FOREIGN PATENT DOCUMENTS

| | | | |
|---|---|---|---|
| EP | 0 051 394 A1 | 5/1982 | ............ G02F/1/29 |
| EP | 0 514 857 A2 | 11/1992 | ............ G02F/1/29 |
| EP | 0 664 474 A1 | 7/1995 | ........... G02F/1/295 |
| JP | 59-69732 | 4/1984 | ............ G02F/1/03 |
| WO | 01/78200 A2 | 10/2001 | |

OTHER PUBLICATIONS

Corral, J.L., et al., "Continuously Variable True Time–Delay Optical Feeder for Phased–Array Antenna Employing Chirped Fiber Gratings," *IEEE Transactions on Microwave Theory and Techniques*, vol. 45, No. 8, pp 1531–1536 (Aug. 1997).

Corral, J.L., et al., "True Time–Delay Scheme for Feeding Optically Controlled Phased–Array Antennas Using Chirped–Fiber Gratings," *IEEE Photonics Technology Letters*, vol. 9, No. 11, pp 1529–1531 (Nov. 1997).

Fu, Z., et al., "Five–Bit Substrate Guided Wave True–Time Delay Module Working up to 2.4 THz with a Packing Density of 2.5 Lines/cm$^2$ for Phased Array Antenna Applications," *Opt. Eng.*, vol. 37, No. 6, pp 1838–1844 (Jun. 1998).

(Continued)

*Primary Examiner*—Akm Enayet Ullah
*Assistant Examiner*—Daniel Petkovsek
(74) *Attorney, Agent, or Firm*—Ladas & Parry LLP

(57) ABSTRACT

A true-time delay feeder for multiple aperture beam steering devices. The feeder comprises a plurality of tunable time delay modules. The tunable time delay modules provide different delays to different beamlets without changing the spectrum of each beamlet. The tunable true-time delay modules provide for temporal synchronization and spatial coherence of the beam front.

46 Claims, 3 Drawing Sheets

U.S. PATENT DOCUMENTS

| | | | | |
|---|---|---|---|---|
| 5,013,979 A | * | 5/1991 | Birleson | 342/375 |
| 5,018,835 A | | 5/1991 | Dorschner | 350/336 |
| 5,051,754 A | | 9/1991 | Newberg | 342/375 |
| 5,082,342 A | | 1/1992 | Wight et al. | 385/8 |
| 5,093,747 A | | 3/1992 | Dorschner | 359/316 |
| 5,117,239 A | | 5/1992 | Riza | 342/375 |
| 5,202,776 A | | 4/1993 | Gesell et al. | 359/17 |
| 5,233,673 A | | 8/1993 | Vali et al. | 385/3 |
| 5,351,127 A | | 9/1994 | King et al. | 356/445 |
| 5,461,687 A | * | 10/1995 | Brock | 385/37 |
| 5,512,907 A | | 4/1996 | Riza | 342/375 |
| 5,623,360 A | | 4/1997 | Gesell et al. | 359/287 |
| 5,774,619 A | | 6/1998 | Bruesselbach | 385/137 |
| 5,943,159 A | | 8/1999 | Zhu | 359/316 |
| 6,137,442 A | * | 10/2000 | Roman et al. | 342/375 |
| 6,295,395 B1 | | 9/2001 | Paek | 385/24 |
| 6,320,539 B1 | | 11/2001 | Matthews et al. | 342/375 |
| 6,388,616 B1 | * | 5/2002 | Zhou | 342/375 |
| 6,393,177 B2 | * | 5/2002 | Paek | 385/24 |
| 6,466,703 B1 | * | 10/2002 | Ionov | 385/10 |
| 6,760,512 B2 | * | 7/2004 | Pepper | 385/27 |
| 2002/0181874 A1 | * | 12/2002 | Tulchinsky et al. | 385/39 |
| 2003/0080899 A1 | * | 5/2003 | Lee et al. | 342/368 |

OTHER PUBLICATIONS

Li, R.L.Q., et al., "High Density Broadband True–Time–Delay Unit on a Single Substrate," *SPIE*, vol. 3006, pp 256–263.

Poladian, L., "Graphical and WKB Analysis of Nonuniform Bragg Gratings," *Physical Review E*, vol. 48, No. 6, pp 4758–4767 (Dec. 1993).

Trezza, J.A., et al., *Large Format Smart Pixel Arrays and Their Companions*. Sanders, a Lockheed Martin Company; IEEE 1998 Aerospace Conference, Mar. 21–28, 1998, 7 pages total.

* cited by examiner

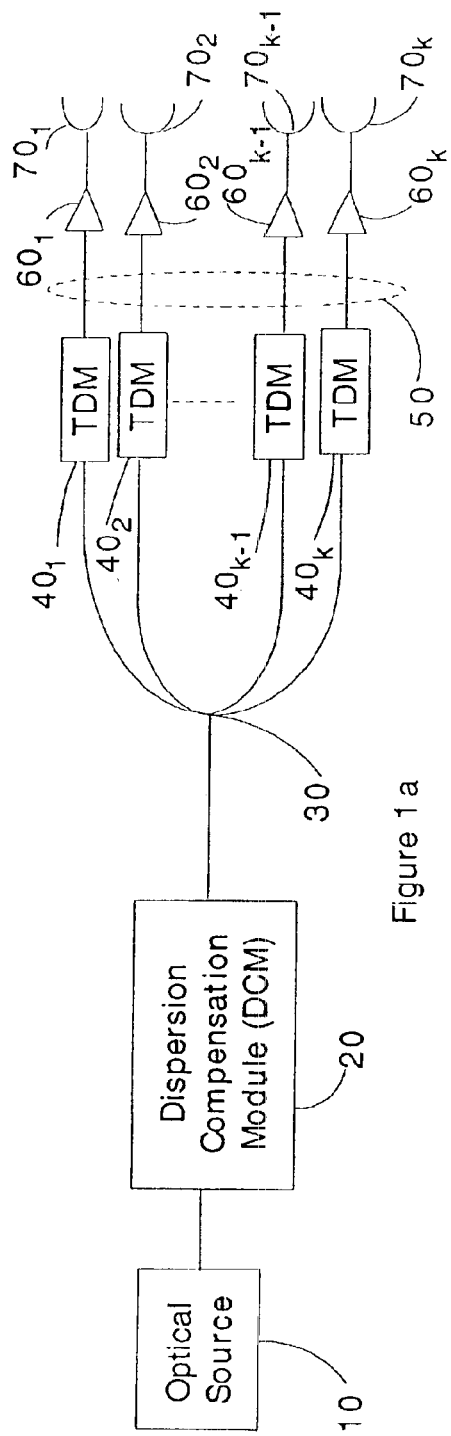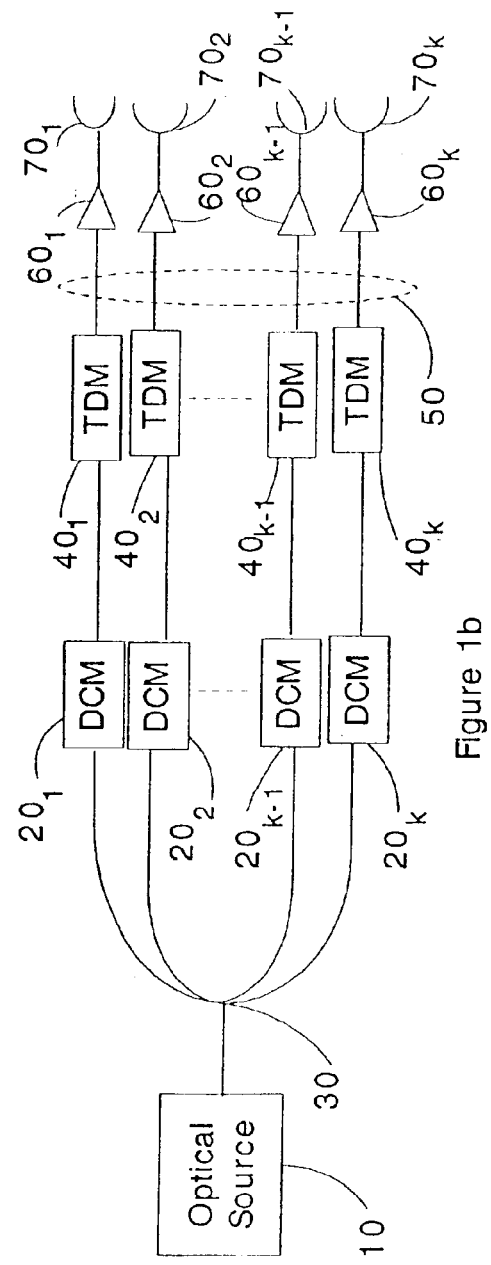
Figure 1a
Figure 1b

MULTI-APERTURE BEAM STEERING SYSTEM WITH WAVEFRONT CORRECTION BASED ON A TUNABLE OPTICAL DELAY LINE

CLAIM OF BENEFIT OF PROVISIONAL APPLICATION

This application claims the benefit of U.S. Provisional application Ser. No. 60/375,614, filed on Apr. 24, 2002, which is incorporated herein by reference in its entirety.

STATEMENT OF GOVERNMENT INTEREST

This invention was made with Government support under Contract No. DAAB07-01-C-K802 awarded by DARPA. The Government may have certain rights in this invention.

FIELD OF THE INVENTION

The present invention relates to optical true-time delay generation. More specifically, the present invention relates to true-time delay generation for multiple aperture optical beam steering devices.

BACKGROUND OF THE INVENTION

Optical beam steering is often required where information from an optical beam must be relayed from one location to another. High data rate, secure laser communications, target designation, and laser radar are a few of the applications in which optical beam steering is required. Optical beam steering may be provided by a single aperture, which directs a light beam in the desired direction.

Devices for single aperture beam steering are well known in the art. Single aperture beam steering can be implemented with electromechanical systems. Such systems generally consist of a mirror mounted on an electrical actuator. These systems provide relatively low losses for the strength of the reflected beam. However, such electromechanical systems are limited to low response frequencies, up to the order of 1 KHz. The moving parts of an electromechanical system along with size and weight factors are considered to be major limitations of such a system.

Multiple aperture beam steering devices may be provided by compact arrays of non-mechanical beam deflectors, such as optical micro electromechanical systems arrays (O-MEMS) or liquid crystal arrays. The optical signal provided to these devices is generally split into multiple optical signals. The array then actually consists of multiple optical apertures that act to steer and radiate multiple optical signals in a desired direction. However, the application of multiple aperture steering devices for fast optical communications and radar applications requires precise synchronization of the optical signals at the individual apertures for different pointing angles of the device. This is necessary to avoid signal scrambling due to mixing of non-synchronized outputs emerging from individual emitters.

Time synchronization is also required since the multiple apertures are generally deployed in a relatively flat plane. Thus, when an optical signal is steered to an angle other than exactly perpendicular to that plane, unsynchronized outputs from the individual apertures do not arrive at a receive point at the same time. This problem is particularly noticeable when the optical signal comprises pulsed signals. In this case, the optical pulse received from the radiating element furthest from the receive point will lag the pulse received from the closest radiating element. Performance of the optical transmitting system is improved when the individual optical beams are made time-coincident to create a time-coincident optical beam.

Further performance enhancement of the optical transmitting system can be provided by improving the spatial coherence of the wavefront produced by the multiple aperture beam steerer, also known in microwave applications as the phase array antenna. Multiple aperture beam steerers such as phased array antenna systems employ a plurality of individual antenna elements that are separately excited to cumulatively produce a transmitted electromagnetic wave that is highly directional. In a phased array, the relative phases of the signals provided to the individual elements of the array are controlled to produce an equiphase beam front in the desired pointing direction of the antenna beam. The transmitted electromagnetic wave, at a given element, is represented by an envelope and fast oscillations of the electric field of the optical carrier. Time synchronization is the alignment of the transmissions of the envelopes, whereas spatial coherence is the alignment of the transmissions of the fast oscillations of the electric fields.

Time synchronization is needed to create a time-coincident optical beam. Spatial coherence is needed so that the transmitted electromagnetic waves from each element combine to form a flat wavefront. The flat wavefront allows for the efficient focusing of the electromagnetic waves onto a target, e.g., into a fiber or onto a small detector. If the system has poor spatial coherence, i.e. the phases are not aligned, the beam can not be focused into the smallest possible spot.

Additionally, phase alignment allows for beam steering. For beam steering the phases are preferably aligned in such a way that they form a tilted plane with respect to the optical steerer (or the surface of the phase array antenna). Further, adjustment of individual phases of the optical signal at a given element allows for the compensation of atmospheric aberrations.

True-time delay for optical signal transmission may be achieved by purely electronic means by splitting an information carrying electronics signal into a number of channels equal to the number of optical apertures. The delay required for optical beam steering is then applied to each one of the channels separately. The properly delayed signals then drive electro-optic modulators that control outputs of the corresponding apertures. This electronic approach to true-time delay for optical beam steering requires very sophisticated and fast electronics that increase cost and complexity.

Optical control systems for producing selected time delays in signals for microwave phased array antennas are well known in the art. Different types of optical architectures have been proposed to process optical signals to generate selected delays, such as routing the optical signals through optical fiber segments of different lengths; using deformable mirrors to physically change the distance light travels along a reflected path before transmission; and utilizing free space propagation based delay lines, the architecture of which typically incorporates polarizing beam splitters and prisms. These techniques may also be used for providing the true-time delays required for optical beam steering. However, these techniques are also costly and complex.

A true-time delay feeder for microwave phased array antenna has been proposed by Corral et al. in "Continuously Variable Time Delay Feeder for Phased Array Antenna Employing Chirped Fiber Gratings", IEEE Trans. Microwave Theory and Tech., vol. 45(8), 1997, p. 1531, and in "True Time-Delay Scheme for Feeding Optically Controlled Phased-Array Antennas Using Chirped Fiber Gratings", IEEE Phot. Tech. Lett., vol. 9(11), 1997, p. 1529. In the system described by Corral et al., each element of the microwave antenna is fed by an individually-tunable optical carrier modulated by the microwave signal. The carrier passes though a dispersive element, a chirped fiber grating, which introduces a delay. The delay for each antenna element is controlled by tuning the corresponding optical carrier. However, the true time-delay feeder described by Corral et al. requires a large number of independently tunable sources (equal to the number of elements in the array). Moreover, for some applications, just as many modulators may be required. Thus, an optical beam steerer according to the teachings of Corral et al. amounts to a complicated and cumbersome system. Further, the teachings of Corral et al. allow only for time synchronization and phase tuning of microwave signals but not for optical signals.

Another true-time delay feeder for phased array antennas has been described in the commonly assigned U.S. patent application Ser. No. 09/877,976, filed Jun. 8, 2001, in the name of Pepper, herein incorporated by reference. In this true-time delay feeder liquid crystals provide both true-time delay and spatial coherence.

Another true-time delay feeder for phased array antenna has been described in commonly assigned, U.S. patent application Ser. No. 09/738,584, filed Dec. 16, 2000, in the name of Ionov, herein incorporated by reference. This true-time delay feeder addresses the issue of temporal overlap of the optical signals leaving the individual apertures. In addition, the optical signals for the individual apertures originate from different spectral components of the original beam. The teachings of Ionov relate to the technical problem of time synchronization.

A fast electro-optic delay generator has been described in commonly assigned U.S. patent application Ser. No. 09/545,632, filed Apr. 7, 2000, in the name of Ionov, herein incorporated by reference. The fast electro-optic delay generator addresses the technical problem of time synchronization. The fast electro-optic delay generator is a costly and complicated device that offers very high speed operation, which may not be necessary for the given application.

A sequential true-time delay system has been described in R.L.Q. Li, Fu, R. Chen, "High Density broadband true-time delay unit on a single substrate," SPIE Vol. 3006 (1997) pp. 256–263. This approach results in non-uniform beam "fan-out" intensity, where the output power decreases with each subsequent optical tap as the beam propagates down the sequential true-time delay scheme.

Hence, a need exists in the art for a true-time delay generator for multiple aperture optical beam steering that addresses the issues of temporal and spatial coherence over the entire field-of-view of the full composite aperture.

SUMMARY OF THE INVENTION

It is therefore an object of the present invention to provide a method and apparatus for providing a true-time delay feeder for multiple aperture optical beam steering. It is further an object of this invention to provide a true-time delay feeder that provides both a temporal synchronization and a spatial coherence over the entire field-of-view of the full composite aperture.

Pursuant to the present invention, a true-time delay feeder is provided by an optical source, a one-to-many coupler, and a plurality of tunable true-time delay modules resulting in a multiple aperture optical beam steering system. The tunable true-time delay modules allow for temporal synchronization and spatial coherence across the entire field-of-view of the full composite aperture.

One embodiment of the present invention is an optical true-time delay generator apparatus for multiple aperture beam steering, said apparatus comprising: means for splitting a time varying signal from an optical source into a plurality of beamlets; and means for true-time delaying said plurality of beamlets, said means for true-time delaying comprising: means for providing a reflection point for each of said plurality of beamlets, said means for providing a reflection point providing a plurality of reflected beamlets; and means for adjusting said reflection point.

Another embodiment of the present invention is a method for true-time delaying an optical signal for use in multiple aperture beam steering, said method comprising the steps of: splitting a time varying signal into a plurality of beamlets; adjusting a reflection point of each of said plurality of beamlets resulting in a plurality of reflected true-time delayed beamlets; and wherein each reflection point may be adjusted independently.

Another embodiment of the present invention is a system comprising: a beam splitter having a beam splitter input and a plurality of beam splitter outputs, said beam splitter receiving a time varying signal from an optical source, said beam splitter producing a plurality of beamlets; and a plurality of tunable true-time delay modules, each tunable true-time delay module being coupled with one of said beam splitter outputs, said plurality of tunable true-time delay modules producing a plurality of reflected true-time delayed beamlets, wherein each of said plurality of tunable true-time delay modules comprises a first chirped distributed Bragg reflector.

Another embodiment of the present invention is a multi-aperture beam steering system comprising: a dispersion compensation module for receiving a train of optical pulses and providing a train of dispersed pulses; a coupler having a coupler input and a plurality of outputs, said coupler receiving said train of dispersed pulses; and a plurality of tunable true-time delay modules, each tunable true-time delay module having an input and an output, said input of each of said plurality of tunable true-time delay modules connected to at least one of said outputs of said coupler, wherein each tunable true-time delay module comprises a chirped distributed Bragg reflector.

Another embodiment of the present invention is a sequential true-time delay system comprising; an optical source, having a source output; a dispersion compensation module comprising: a first optical circulator, having a first dispersion port, a second dispersion port and a third dispersion port, wherein said first dispersion port of said first optical circulator is connected with said source output; and a first chirped distributed Bragg reflector connected with said second dispersion port of said first optical circulator; a star coupler having a star input and a plurality of outputs, said star input connected to said third dispersion port of said first optical circulator; and a plurality of tunable true-time delay modules, each tunable true-time delay module comprising: a second optical circulator, having a first delay port, a second delay port and a third delay port, wherein said first delay port of said second optical circulator is connected with one of said plurality of outputs of said star coupler; a second chirped distributed Bragg reflector grating connected with said second delay port of said second optical circulator; a means for adjusting said chirped distributed Bragg reflector, said means for adjusting being coupled to said chirped distributed Bragg reflector; and a phase control element having a phase input and a phase output, said phase input connected to said third delay port of said second optical circulator.

BRIEF DESCRIPTION OF THE DRAWINGS

FIG. 1a shows a block diagram of a multi-aperture beam steering system with the wavefront coherent true-time delay module according to the present invention;

FIG. 1b shows another embodiment of the multi-aperture beam steering system;

DETAILED DESCRIPTION OF THE PREFERRED EMBODIMENTS

The present invention now will be described more fully hereinafter with reference to the accompanying drawings, in which preferred embodiments of the invention are shown. This invention may be embodied in many different forms and should not be construed as limited to the embodiments set forth herein.

A block diagram of a preferred embodiment of the present invention is shown in FIG. 1a. An optical source 10 generates a time varying signal that is preferably first passed through an optional dispersion compensation module 20. An example of a time varying signal is a train of optical pulses. The time varying signal is then passed through a 1×N coupler 30, splitting the time varying signal into a plurality of beamlets. Each beamlet is passed through a tunable true-time delay module $40_i$–$40_k$. The tunable true-time delay modules provide an array of reflected true-time delayed beamlets 50, that may be used in beam-steering applications. Each of the tunable true-time delay modules $40_i$–$40_k$ provides for independent control of the delay of each of the beamlets, thereby providing temporal synchronization of the reflected true-time delayed beamlets. Additionally, each of the reflected true-time delayed beamlets may be amplified by amplifiers $60_i$–$60_k$.

Amplification is particularly desirable in applications where high power output is required. Further, optional radiators $70_i$–$70_k$, such as mirror elements, may be coupled to receive the reflected true-time delayed beamlets and radiate the reflected true-time delayed beamlets providing a coherent wavefront.

The optional dispersion compensation module 20 may be used in the system to compensate for the dispersion of the time varying signal as it passes later through the coupler 30 and a tunable true-time delay modules $40_i$–$40_k$.

The optical source 10 is preferably chosen depending upon the system application. Non-limiting examples of the optical source 10 include a laser with a modulator, or a mode locked laser. One skilled in the art will appreciate that there are a variety of optical sources that can be used.

Figure 1C:
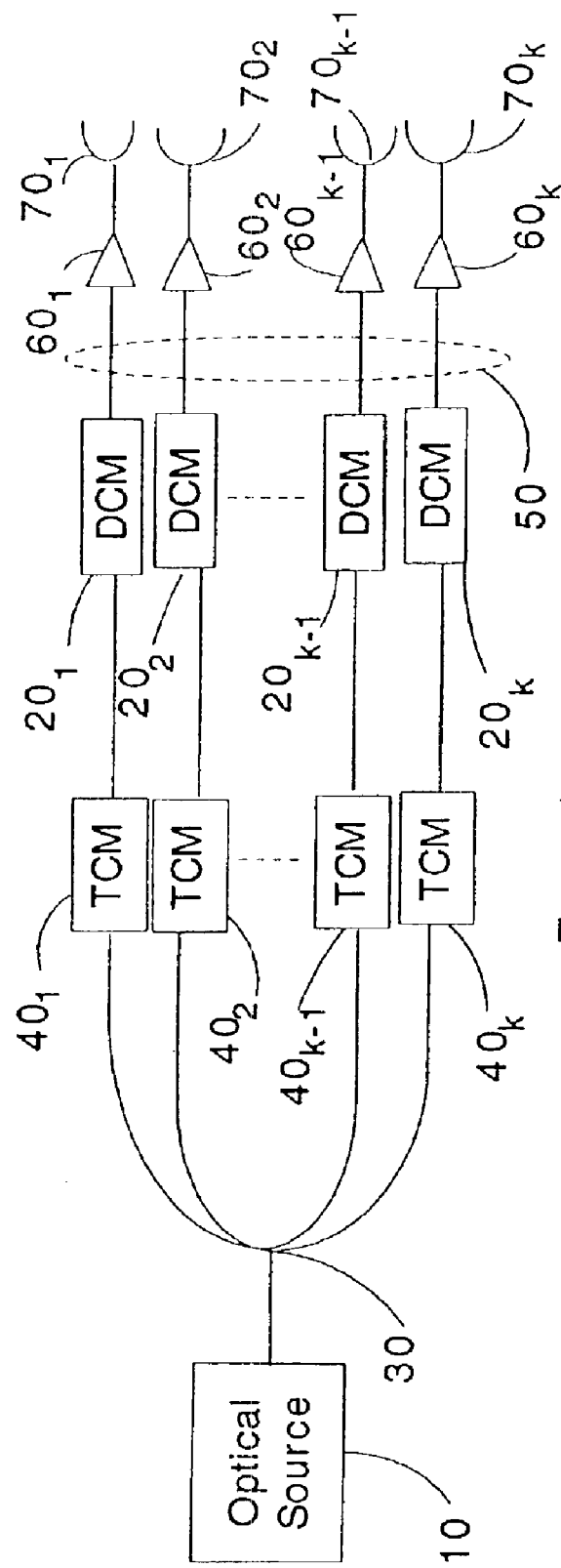
FIG. 1c shows yet another embodiment of the multi-aperture beam steering system.

As noted above, the time varying signal is preferably passed through an optional dispersion compensation module 20 resulting in an optionally dispersed optical signal. The optional dispersion compensation module 20 corrects for the dispersion created later in the beamlets, by introducing dispersion to the optical signal equal in magnitude and opposite in sign to the dispersion acquired in the tunable true-time delay modules $40_i$–$40_k$, thereby maintaining the temporal pulse shape of the initial input pulse. One skilled in the art will appreciate that the optional dispersion compensation module 20 may be inserted in any part of the optical path between the optical source 10 and an array of individual beamlets 50. FIG. 1a depicts a dispersion compensation module being inserted between the optical source 10 and a 1×N coupler 30. FIG. 1b depicts a plurality of dispersion compensation modules $20_i$–$20_k$. Each dispersion compensation module $20_i$–$20_k$ being inserted between an output of the 1×N coupler 30 and a tunable true-time delay module $40_i$–$40_k$. FIG. 1c depicts a plurality of dispersion compensation modules $20_i$–$20_k$, each dispersion compensation module $20_i$–$20_k$ being placed after a tunable true-time delay module $40_i$–$40_k$. However, in the preferred embodiment, as depicted in FIG. 1a, the dispersion compensation module 20 is placed before the coupler 30, resulting in only one dispersion compensation module 20 being used in the system.

The optionally dispersed optical signal is provided to a plurality of tunable true-time delay modules $40_i$–$40_k$. One method (well known in the art) of creating multiple beamlets from one signal, or optical beam, is through the use of a 1×N coupler 30. A preferred 1×N coupler is a star coupler from JDS Uniphase (San Jose, Calif.). One skilled in the art will appreciate that there are many 1×N couplers that could be used. In addition, a tree of 3 dB couplers may be used in place of the 1×N coupler. An advantage of the preferred embodiment is that, by parallel processing the beam with the star coupler 30, the beamlets are equal in intensity, thus the issue of non-uniform beam "fan-out" intensity is eliminated.

Figure 2:
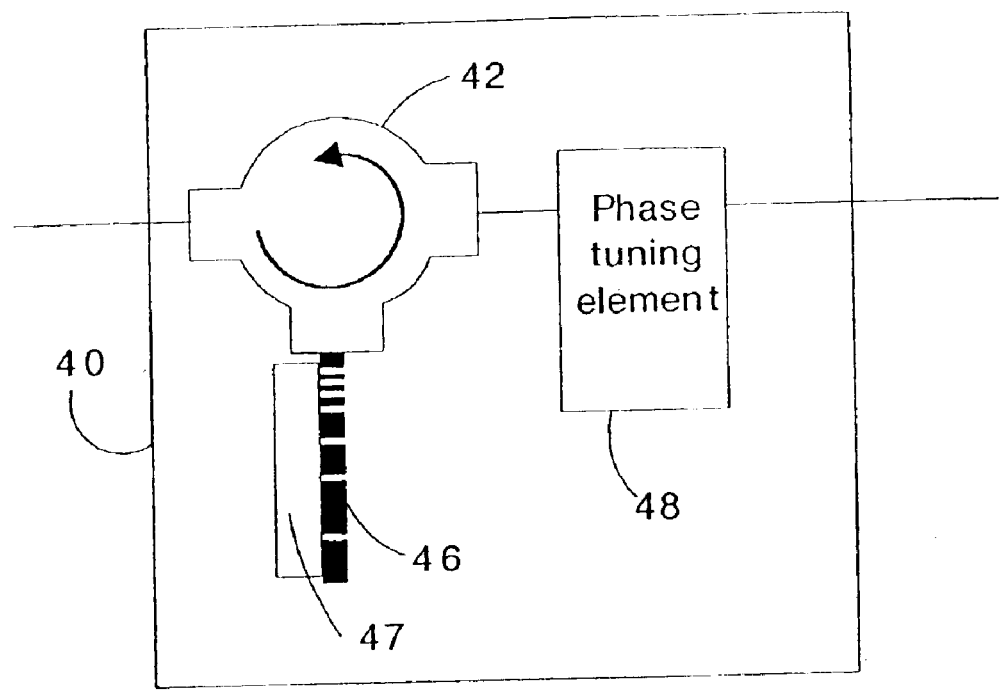
FIG. 2 shows a block diagram of one embodiment of the tunable true-time delay module.

As shown in FIG. 2, each tunable true-time delay module $40_i$–$40_k$ provides a means for true-time delaying each beamlet as well as an optional means for phase tuning 48 to adjust the phase in each reflected true-time delayed beamlet. The optional phase tuning element 48 provides the ability to increase the spatial coherence of the multi-element optical beam steerer. Phase tuning the individual beams may be accomplished by various means, e.g., by stretching/compressing a piece of the optical fiber with a separate piezo element, or by temperature controlling a section of fiber by winding a wire mount heater on the section of fiber. Piezo stretching/compressing devices are commercially available from a number of manufacturers including Canadian Instrumentation & Research, Ltd. (Burlington, Ontario, Canada). In addition, if fiber amplifiers are used in each aperture beam path, phase controlling of the fiber amplifiers may provide the necessary phase tuning. Phase tuning of the individual beams may be done by changing their gain slightly, as described in commonly assigned U.S. patent application Ser. No. 09/574,282 in the name of Minden, herein incorporated by reference. Independent of the phase tuning mechanism, phase tuning of the individual beams requires optical wavefront sensors and closed feedback loops (not shown in FIG. 1a because it is well known in the art).

The means for true-time delaying a beamlet may be provided though the use of chirped distributed Bragg reflector 46 mounted on a stretcher/compressor 47, and a means for directional coupling optical signals 42 into and out of the chirped distributed Bragg reflector 46. Chirped distributed Bragg reflectors 46 are commercially available from a variety of manufacturers including JDS Uniphase. In the preferred embodiment the means for directional coupling is an optical circulator 42. Optical circulators 42 are commercially available from a number of manufacturers including JDS Uniphase. Other means for directional coupling 42 are available, including a 3 dB coupler coupled to a fiber grating. An optical circulator 42 is preferable due to the system losses involved in other options. In addition, use of an optical circulator 42 simplifies implementation compared to other means.

In the preferred embodiment, the optical signal at the output of the coupler 30 is passed to the optical circulator 42.

The optical circulator 42 passes the optical signal from the coupler 30 to the chirped distributed Bragg reflector (DBR) 46.

The chirped DBR 46 reflects light at different wavelengths at different points within the chirped DBR 46. The reflection point within the chirped DBR 46 may be changed by stretching or compressing a fiber grating within the chirped DBR 46. The preferred method for stretching or compressing the fiber grating is similar to the electronic tuning of a chirped electro-optical DFB described in U.S. patent application Ser. No. 09/545,632 filed on Apr. 7, 2000 in the name of Ionov, herein incorporated by reference. In addition to electronic tuning, mechanical means can be used for stretching or compressing the fiber grating as is described in U.S. Pat. No. 5,774,619, H. Brusselbach, "Precision Deformation Mechanism and Method" herein incorporated by reference. At the output of the chirped DBR 46 the spectrum of the reflected true-time delayed beamlet is essentially unchanged, less than 1% deviation, from the spectrum of the original time varying signal from the optical source 10.

The engineering details of the fiber grating are chosen from the following considerations. Assume the steered optical signal has a 10 GHz bandwidth and that its central wavelength is $\lambda_o=1.55$ μm. In a chirped grating the period changes according to $$\Lambda=\Lambda_o/(1+Cz) \quad (1)$$

where $\Lambda_o$ is the central period, C is the chirp parameter and $-L/2<z<L/2$ where L is the physical length of the fiber grating. The central period of the chirped fiber grating is determined from the resonant conditions with the optical pulse, i.e., $$L_o=l_o/2n_{eff}\approx 0.53 \text{ μm} \quad (2)$$

where $n_{eff}\approx 1.45$ is the effective refractive index of the fiber.

The chirp of the DBR is calculated from the following considerations. Following the notations of Paladian, "Graphical and WKB analysis of non-uniform Bragg gratings", Phys. Rev. E. vol. 48, p. 4758, 1993, where detuning has been substituted for wavelength, for a given 1, detuning in a chirped grating changes linearly with length, $$\delta(z) = \frac{2\pi n_{eff}}{\lambda} - \frac{\pi}{\Lambda_o} - \frac{2\pi Cz}{\Lambda_o} \quad (3)$$

where C is the chirp parameter. The total chirp across the entire DBR must be sufficient for covering the entire spectrum of the optical signal. In other words, for every wavelength that has significant presence in the spectrum of the optical signal, there must be a point in the chirped DBR, where the resonance condition is met (i.e., where δ=0). An optical signal with 10 GHz bandwidth has a spectral width $\delta\lambda_{FWHM}=0.01$ nm (FWHM), where FWHM is full width half maximum. Typically, a spectral width of 5–10 FWHM should be sufficient for covering most of the pulse's spectrum including the wings. This yields the requirement of $\Delta\lambda\approx 10\ \delta\lambda_{FWHM}\approx 0.1$ nm for the spectral width, and $$C_{min}L/2 \approx \frac{1}{1-10\delta\lambda_{FWHM}/2\lambda_o} - 1 \approx 5\delta\lambda_{FWHM}/\lambda_o \quad (4)$$

for $\delta\lambda_{FWHM}=0.01$ nm, $\lambda_o=1550$ nm, and L=5 cm, $C_{min}\approx 1.3\times 10^{-5}$ cm$^{-1}$. Thus, as can be seen from equation 4, smaller chirps will be required for longer DBR structures. Higher chirp values may be chosen than the ones yielded from the above equation; however, higher chirp values will require larger stretching for achieving the same delay values, as will be seen below. Preferably, the chirp grating should reflect most of the optical signal to reduce the system's inefficiency. This is accomplished by writing the chirp gratings with sufficient modulation of the refractive index, as is well known in the art. Stretching, or compressing, changes the period of the grating and, therefore, the resonant conditions with the optical signal as described in U.S. Pat. No. 5,774,619, H. Brusselbach, "Precision Deformation Mechanism and Method". It is known in the art that pulling, or compressing, an optical fiber by as much as 1% is relatively safe.

The magnitude of the maximum stretching is determined as follows. The maximum delay is achieved when the resonant condition is shifted from the center of the grating to halfway between the center of the grating and one of its edges. The central resonance is preferably not shifted all the way to the end. In the case of the present invention, if the central resonance is shifted all the way to the end a problem arises where half of the signal bandwidth will not be reflected. By shifting the central resonance only halfway between the center of the grating and one of its edges, the problem is avoided, providing that the total width of the grating reflection spectrum is sufficiently wide, i.e., $\Delta\lambda=5-10\ \delta\lambda_{FWHM}$. Therefore, the grating period halfway between the center of the grating and the edge should be changed from $\Lambda_o/(1+CL/4)$ to $\Lambda_o$. As a result the relative stretch is $\delta L/L=CL/4\sim 10^{-4}$, which is well within the limit for fiber mechanical failure. If one chooses a grating with higher chirp parameters than the minimum set by equation 4, proportionally higher stretching/compression will be required. Shifting the resonant conditions from the center to halfway towards the edge of the grating delays, or advances, the optical signal by the round-trip time from the center to the edge, i.e., by $Ln_{eff}/2c\sim\pm 120$ ps.

Figure 3:
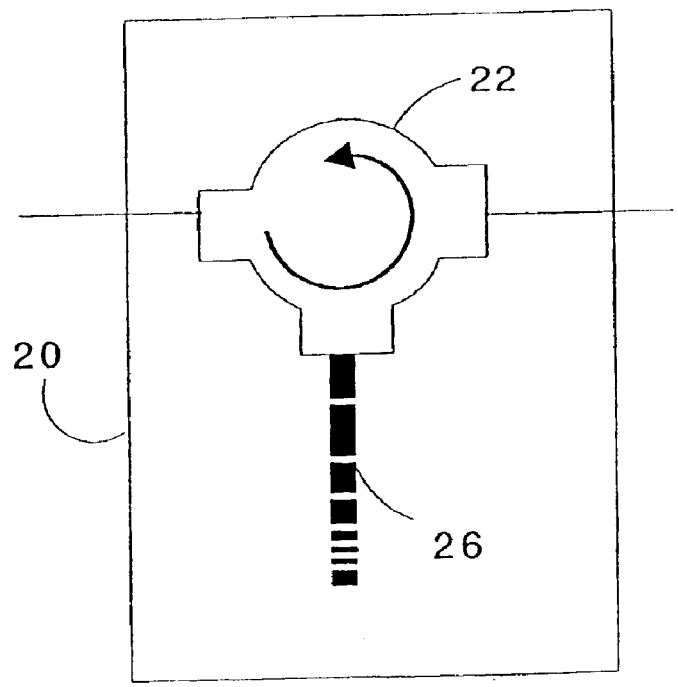
FIG. 3 shows a block diagram of one embodiment of the optional dispersion compensation module.

FIG. 3 shows the components of the optional dispersion-compensation module 20. It is similar to the tunable true-time delay module 40, as shown in FIG. 2, in that it contains a chirped distributed Bragg reflector (DBR) 26 and a means for directional coupling optical signals 22 into and out of the chirped Bragg reflector 26. As in the tunable true-time delay module 40, the means for directional coupling optical signals is preferably an optical circulator 22. However, unlike the chirped DBR 46 of the tunable true-time delay module 40, the chirped DBR 26 of the dispersion-compensation module 20 is reversed in its orientation relative to the optical circulator 22. In addition, the dispersion-compensation module 20 does not contain the means 47 of the true-time delay module 40 for stretching/compressing the grating. As a result, the dispersion due to the chirped DBR 26 itself is compensated and the pulse shape will be maintained after transmitting the chirped DBR 46 contained in each of the tunable true-time delay modules $40_1-40_k$.

From the foregoing description, it will be apparent that the present invention has a number of advantages, some of which have been described herein, and others of which are inherent in the embodiments of the invention described herein. Also, it will be understood that modifications can be made to the method and apparatus of true-time delay generation described herein without departing from the teachings of the subject matter described herein. As such, the invention is not to be limited by the described embodiments except as required by the appended claims.

What is claimed is:

1. An optical true-time delay generator apparatus for multiple aperture beam steering, said apparatus comprising:

means for splitting a time varying signal from an optical source into a plurality of
beamlets; and means for true-time delaying said plurality of beamlets, said means for true-time delaying comprising:
means for providing a reflection point for each of said plurality of beamlets, said means for providing a reflection point providing a plurality of reflected beamlets; and
means for continuously adjusting said reflection point.

2. The optical true-time delay generator apparatus of claim 1 wherein said means for true-time delaying said plurality of beamlets further comprises a means for phase tuning said plurality of reflected beamlets.

3. The optical true-time delay generator apparatus of claim 2 wherein said means for phase tuning comprises a fiber mounted on a piezo stretcher, a temperature controlled section of fiber, or a phase controlled fiber amplifier.

4. The optical true-time delay generator apparatus of claim 1 further comprising a means for correcting dispersion in said beamlets, said means for correcting dispersion receiving said time varying signal and providing a dispersion corrected time varying signal to said means for splitting.

5. The optical true-time delay generator apparatus of claim 4 wherein said means for correcting dispersion comprises a chirped distributed Bragg reflector coupled to a directional coupler.

6. The optical true-time delay generator apparatus of claim 1 further comprising means for correcting dispersion in said beamlets, said means for correcting dispersion receiving at least one beamlet from said splitting means and providing at least one dispersion corrected beamlet to said means for true-time delaying.

7. The optical true-time delay generator apparatus of claim 1 further comprising a plurality of means for correcting dispersion in said plurality of reflected beamlets, each of said means for correcting dispersion receiving at least one reflected beamlet from said means for true-time delaying.

8. The optical true-time delay generator apparatus of claim 1 further comprising a means for radiating said plurality of reflected beamlets.

9. The optical true-time delay generator apparatus of claim 1 wherein said means for providing a reflection point comprises a chirped distributed Bragg reflector, said means for adjusting said reflection point comprises a stretcher/compressor coupled with the chirped distributed Bragg reflector, and said means for true-time delaying further comprises a directional coupler coupled with said chirped distributed Bragg reflector.

10. The optical true-time delay generator apparatus of claim 9 wherein said directional coupler comprises an optical circulator.

11. The optical true-time delay generator apparatus of claim 1 wherein said means for splitting comprises a star coupler.

12. The optical true-time delay generator apparatus of claim 1 further comprising a means for amplifying said plurality of reflected beamlets.

13. A method for true-time delaying an optical signal for use in multiple aperture beam steering, said method comprising:
splitting a time varying signal into a plurality of beamlets;
adjusting a reflection point of each of said plurality of beamlets resulting in a plurality of reflected true-time delayed beamlets; and
wherein each reflection point may be adjusted independently and continuously.

14. The method of claim 13 further comprising compensating for dispersion created in said plurality of reflected true-time delayed beamlets.

15. The method of claim 14 wherein said compensating for dispersion further comprises adjusting a chirped distributed Bragg reflector coupled to a directional coupler.

16. The method of claim 13 further comprising increasing the spatial coherence of at least one of said plurality of reflected true-time delayed beamlets.

17. The method of claim 16 wherein said increasing the spatial coherence further comprises phase tuning at least one of said plurality of reflected true-time delayed beamlets.

18. The method of claim 17 wherein said phase tuning further comprises mounting a fiber on a piezo stretcher, temperature controlling a section of fiber or phase controlling a fiber amplifier.

19. The method of claim 13 wherein said adjusting a reflection point further comprises:
providing a chirped distributed Bragg reflector coupled with a directional coupler for receiving at least one of said plurality of beamlets; and
adjusting the chirped distributed Bragg reflector.

20. The method of claim 19 wherein said directional coupler is an optical circulator.

21. The method of claim 13 further comprising amplifying at least one of said plurality of reflected true-time delayed beamlets.

22. The method of claim 13 further comprising transmitting at least one of said plurality of reflected true-time delayed beamlets from an optical radiating element.

23. A system comprising:
a beam splitter having a beam splitter input and a plurality of beam splitter outputs, said beam splitter receiving a time varying signal from an optical source, said beam splitter producing a plurality of beamlets; and
a plurality of continuously tunable true-time delay modules, each tunable true-time delay module being coupled with one of said beam splitter outputs, said plurality of tunable true-time delay modules producing a plurality of reflected true-time delayed beamlets,
wherein each of said plurality of tunable true-time delay modules comprises a first adjustable chirped distributed Bragg reflector.

24. The system of claim 23 wherein at least one of said plurality of tunable true-time delay modules further comprises:
a first directional coupler coupled with said first chirped distributed Bragg reflector; and
a means for adjusting the first chirped distributed Bragg reflector, said means being coupled with said first chirped distributed Bragg reflector.

25. The system of claim 24 wherein at least one of said plurality of tunable true-time delay modules further comprises a phase tuning element coupled with said first directional coupler.

26. The system of claim 25 wherein said phase tuning element is a fiber mounted on a piezo stretcher, a temperature controlled section of a fiber or a phase controlled fiber amplifier.

27. The system of claim 24 wherein said first directional coupler is a first optical circulator.

28. The system of claim 23 further comprising a dispersion compensation module having a dispersion compensation input and a dispersion compensation output, said dispersion compensation input being coupled with said optical source and said dispersion compensation output being coupled with said beam splitter input.

29. The system of claim 28 wherein said dispersion compensation module comprises:
a second optical circulator; and
a second chirped distributed Bragg reflector coupled with said second optical circulator.

30. The system of claim 23 further comprising a plurality of dispersion compensation modules, each dispersion compensation module being coupled with one of said plurality of tunable true time delay modules.

31. The system of claim 23 wherein said beam splitter comprises a star coupler.

32. The system of claim 23 further comprising a plurality of amplifiers, at least one of said plurality of amplifiers being coupled with at least one of said plurality of tunable true-time delay modules.

33. The system of claim 23 further comprising a plurality of radiating elements, said plurality of radiating elements radiating said reflected true-time delayed beamlets.

34. A multi-aperture beam steering system comprising:
a dispersion compensation module for receiving a train of optical pulses and providing a train of dispersed pulses;
a coupler having a coupler input and a plurality of outputs, said coupler receiving said train of dispersed pulses; and
a plurality of continuously tunable true-tune delay modules, each tunable true-time delay module having an input and an output, said input of each of said plurality of tunable true-time delay modules connected to at least one of said outputs of said coupler,
wherein each tunable true-time delay module comprises an adjustable chirped distributed Bragg reflector.

35. The multi-aperture beam steering system of claim 34 wherein said coupler is a star coupler.

36. The multi-aperture beam steering system of claim 34 wherein each tunable true-time delay module further comprises: an optical circulator, having a first delay port, a second delay port and a third delay port wherein said first delay port is said input of said tunable true-time delay module, said chirped distributed Bragg reflector being connected to said second delay port
of said optical circulator;
a means for adjusting said chirped distributed Bragg reflector, said means for adjusting being coupled to said chirped distributed Bragg reflector; and
a phase tuning element, having a phase input and a phase output, said phase input connected to said third delay port of said optical circulator, and wherein said output of said tunable true-time delay module is said phase output.

37. The multi-aperture beam steering system of claim 36 wherein said phase tuning element is a fiber mounted on a piezo stretcher.

38. The multi-aperture beam steering system of claim 34 wherein said dispersion compensation module comprises:
an optical circulator, having a first dispersion port, a second dispersion port and a third dispersion port, wherein said first dispersion port receives said train of optical pulses, and said third dispersion port provides said train of dispersed pulses; and
a chirped distributed Bragg reflector connected with said second dispersion port of said optical circulator.

39. A sequential true-time delay system comprising:
an optical source, having a source output;
a dispersion compensation module comprising:
a first optical circulator, having a first dispersion port, a second dispersion port and a third dispersion port, wherein said first dispersion port of said first optical circulator is connected with said source output; and
a first chirped distributed Bragg reflector connected with said second dispersion port of said first optical circulator;
a star coupler having a star input and a plurality of outputs, said star input connected to said third dispersion port of said first optical circulator; and
a plurality of tunable true-time delay modules, each tunable true-time delay module comprising;
a second optical circulator, having a first delay port, a second delay port and a third delay port, wherein said first delay port of said second optical circulator is connected with one of said plurality of outputs of said star coupler;
a second chirped distributed Bragg reflector grating connected with said second delay port of said second optical circulator;
a means for adjusting said chirped distributed Bragg reflector, said means for adjusting being coupled to said chirped distributed Bragg reflector; and
a phase control element having a phase input and a phase output, said phase input connected to said third delay port of said second optical circulator.

40. An optical true-time delay generator apparatus for multiple aperture beam steering, said apparatus comprising:
means for splitting a time varying signal from an optical source into a plurality of beamlets; and
means for true-time delaying said plurality of beamlets, said means for true-time delaying comprising:
means for providing a reflection point for each of said plurality of beamlets, said means for providing a reflection point providing a plurality of reflected beamlets; and
means for adjusting said reflection point,
wherein said means for true-time delaying said plurality of beamlets further comprises a means for phase tuning said plurality of reflected beamlets, said means for phase tuning comprising a fiber mounted on a piezo stretcher, a temperature controlled section of fiber, or a phase controlled fiber amplifier.

41. An optical true-time delay generator apparatus for multiple aperture beam steering, said apparatus comprising:
means for splitting a time varying signal from an optical source into a plurality of beamlets; and
means for true-time delaying said plurality of beamlets, said means for true-time delaying
comprising:
means for providing a reflection point for each of said plurality of beamlets, said means for providing a reflection point providing a plurality of reflected beamlets; and
means for adjusting said reflection point,
wherein said means for providing a reflection point comprises a chirped distributed Bragg reflector, said means for adjusting said reflection point comprises a stretcher/compressor coupled with the chirped distributed Bragg reflector, and said means for true-time delaying further comprises a directional coupler coupled with said chirped distributed Bragg reflector.

42. The optical true-time delay generator apparatus of claim 41 wherein said directional coupler comprises an optical circulator.

43. A method for true-time delaying an optical signal for use in multiple aperture beam steering, said method comprising:

splitting a time varying signal into a plurality of beamlets;

adjusting a reflection point of each of said plurality of beamlets resulting in a plurality of reflected true-time delayed beamlets, wherein each reflection point may be adjusted independently; and phase tuning at least one of said plurality of reflected true-time delayed beamlets, wherein said phase tuning is provided by mounting a fiber on a piezo stretcher, temperature controlling a section of fiber or phase controlling a fiber amplifier.

44. A system comprising:

a beam splitter having a beam splitter input and a plurality of beam splitter outputs, said beam splitter receiving a time varying signal from an optical source, said beam splitter producing a plurality of beamlets; and a plurality of tunable true-time delay modules, each tunable true-time delay module being coupled with one of said beam splitter outputs, said plurality of tunable true-time delay modules producing a plurality of reflected true-time delayed beamlets, wherein each of said plurality of tunable true-time delay modules comprises a first chirped distributed Bragg reflector, and wherein at least one of said plurality of tunable true-time delay modules further comprises:

a first directional coupler coupled with said first chirped distributed Bragg reflector; and a means for adjusting the first chirped distributed Bragg reflector, said means being coupled with said first chirped distributed Bragg reflector; and a phase tuning element coupled with said first directional coupler, wherein said phase tuning element is a fiber mounted on a piezo stretcher, a temperature controlled section of a fiber or a phase controlled fiber amplifier.

45. A multi-aperture beam steering system comprising:

a dispersion compensation module for receiving a train of optical pulses and providing a train of dispersed pulses;

a coupler having a coupler input and a plurality of outputs, said coupler receiving said train of dispersed pulses; and a plurality of tunable true-time delay modules, each tunable true-time delay module having an input and an output, said input of each of said plurality of tunable true-time delay modules connected to at least one of said outputs of said coupler, wherein each tunable true-time delay module comprises:

a chirped distributed Bragg reflector, an optical circulator, having a first delay port, a second delay port and a third delay port wherein said first delay port is said input of said tunable true-time delay module, said chirped distributed Bragg reflector being connected to said second delay port of said optical circulator;

a means for adjusting said chirped distributed Bragg reflector, said means for adjusting being coupled to said chirped distributed Bragg reflector; and a phase tuning element, having a phase input and a phase output, said phase input connected to said third delay port of said optical circulator, and wherein said output of said tunable true-time delay module is said phase output.

46. The multi-aperture beam steering system of claim 45 wherein said phase tuning element is a fiber mounted on a piezo stretcher.

* * * * *